United States Patent [19]

Minamizawa

[11] Patent Number: 5,925,116
[45] Date of Patent: Jul. 20, 1999

[54] MULTI-FUNCTION PERIPHERAL DEVICE HAVING A PLURALITY OF FUNCTIONAL UNITS FOR EXERTING MUTUALLY DIFFERENT FUNCTIONS BY EXCHANGING DATA WITH INFORMATION PROCESSING DEVICE USING A SPECIFIC COMMAND

[75] Inventor: Fumihiro Minamizawa, Toyoake, Japan

[73] Assignee: Brother Kogyo Kabushiki Kaisha, Nagoya, Japan

[21] Appl. No.: 08/845,198

[22] Filed: Apr. 21, 1997

[30] Foreign Application Priority Data

May 14, 1996 [JP] Japan ................................ 8-118846

[51] Int. Cl.$^6$ .......................... G06F 13/14; G06F 13/32; G06F 13/36
[52] U.S. Cl. ............................ 710/64; 710/65; 710/66; 710/5; 710/14; 710/18; 710/19
[58] Field of Search ........................ 358/400, 407, 358/444; 379/100, 100.15; 395/425; 710/65, 66, 18, 19, 5, 6

[56] References Cited

U.S. PATENT DOCUMENTS

| | | | |
|---|---|---|---|
| 5,179,684 | 1/1993 | Tochi et al. .......................... | 395/425 |
| 5,216,706 | 6/1993 | Nakajima .............................. | 379/100 |
| 5,715,302 | 2/1998 | Lee ...................................... | 379/100.16 |
| 5,812,277 | 9/1998 | Kotani et al. ........................ | 358/400 |

Primary Examiner—Thomas C. Lee
Assistant Examiner—Mohamed Mashaal
Attorney, Agent, or Firm—Oliff & Berridge, PLC

[57] ABSTRACT

A multi-function peripheral device, connected to an information processing device, has a plurality of functional units for exerting mutually different functions by exchanging data with the information processing device. The multi-function peripheral device includes a specific command judgment unit for judging whether data from the information processing device contains a specific command corresponding to any one of the plurality of the functional units and a data supplier for acting when the specific command detector determines that the specific command exists. The data supplier thereupon supplies the data from the information processing device, including the specific command, to the one of the functional units to which the specific command corresponds.

20 Claims, 3 Drawing Sheets

MULTI-FUNCTION PERIPHERAL DEVICE HAVING A PLURALITY OF FUNCTIONAL UNITS FOR EXERTING MUTUALLY DIFFERENT FUNCTIONS BY EXCHANGING DATA WITH INFORMATION PROCESSING DEVICE USING A SPECIFIC COMMAND

BACKGROUND OF THE INVENTION

1. Field of Invention

The invention relates to a multi-function peripheral device connected to an information processing device and having a plurality of functional units for exerting mutually different functions by exchanging data with the connected information processing device.

2. Description of Related Art

Today, peripheral devices for use with computers, such as personal computers, have a growing variety of functions to offer. Illustratively, there exists a multi-function peripheral device having both a facsimile communication function and a printer function. This kind of multi-function peripheral device typically comprises switch means for switching between the facsimile communication function and the printer function. As such, conventional multi-function peripheral devices have two disadvantages: an additional manufacturing cost to provide the switch means, and the chore of manually operating the switch means.

SUMMARY OF THE INVENTION

It is therefore an object of the invention to provide a multi-function peripheral device that requires no additional manufacturing cost to furnish the functional switch means and that eliminates the need for manually operating the switch means.

According to a preferred embodiment of the invention thereof, there is provided a multi-function peripheral device connected to an information processing device and having a plurality of functional units for exerting mutually different functions by exchanging data with the computer. The multi-function peripheral device includes a specific command detector for judging whether data from the computer includes a specific command corresponding to any one of the plurality of functional units and a data supplier for acting when the specific command detector judges that the specific command exists. The data supplier thereupon supplies the data from the computer including the specific command to the one of the functional units to which the specific command corresponds.

With the multi-function peripheral device according to the first object of the invention discussed above, a specific command included in data from the computer is used in judging which functional unit the data is destined for. Once the appropriate functional unit is identified, the data is automatically supplied thereto. This structure eliminates an added manufacturing cost to provide the traditional function switching means and the chore of manually operating such means.

The computer connected to the multi-function peripheral device may be a personal computer, a workstation, or any other general-purpose computer. The computer may also be a specialized computer such as a word processor. The functional units include, but are not limited to, a facsimile communication function, a printer function and an image reading function. The specific command detector and data supplier may be implemented by use of a CPU, but are not limited thereto. Logic circuits may also be used to implement these means. All of the plurality of functions except one need to correspond with mutually distinguishable specific commands. One of the functional units need not have a specific command assigned thereto. That is, if no specific command is detected in the data from the computer, the data is judged to be destined for that functional unit which has no specific corresponding command. One or a plurality of specific commands may be assigned to each functional unit, provided that such commands will not be included in data destined for any other functional units. Where data is placed into storage means such as a RAM before a judgment on the presence of a specific command, the specific command is allowed to exist anywhere in the data.

According to another object of the invention, which is the multi-function peripheral device, the specific command detector judges whether the specific command corresponding to any one of the plurality of functional units exists within a predetermined length of the data from the computer, the predetermined data length being defined relative to the beginning of the data. With this preferred structure, the multi-function peripheral device offers the same advantages as those of the above described peripheral device, and provides another advantage. That is, the data from the computer is checked for the presence of a specific command without the intervention of the storage means such as a RAM, so that the data may be supplied immediately to the appropriate functional unit.

Although the length of data in which to detect a specific command can be determined as desired, an optimum data length needs to be established. Too long data lengths will delay the command detecting process whereas too short lengths may hamper the detection of the command. Specifically, the data length may be set to about 20 bytes.

According to an additional object of the invention, which is the multi-function peripheral device, having judged that no data has been received from the computer at least for a predetermined period of time, the specific command detector thereupon judges whether the specific command exists within a predetermined length of data received anew from the computer following the judgment of absence of data from the computer, the predetermined data length being defined relative to the beginning of the newly received data. With this preferred structure, the multi-function peripheral device offers the same advantages as those of any one of the above described peripheral devices, and provides a further advantage. That is, the structure allows an end of data to be readily detected without the use of an additional command indicative of data termination. Specifically, when data input has been discontinued at least for the predetermined period of time, the end of data is judged to have occurred.

According to yet another object of the invention, which is the multi-function peripheral device, when the specific command detector judges that the specific command does not exist, the data supplier thereupon supplies the data from the computer to one of the plurality of functional units to which the specific command does not correspond. With this preferred structure, the multi-function peripheral device allows one of the plurality of functional units to correspond with no specific command. Such a multi-function peripheral device offers the same advantages as those of any one of the above described peripheral devices and provides an added functional unit that may be controlled.

Only one functional unit is allowed to be assigned no specific command. If a plurality of functional units have no specific command corresponding thereto, the absence of a specific command in the data will leave undetermined the exact functional unit for which the data is destined.

According to still another object of the invention, which is the multi-function peripheral device, the plurality of functional units comprise a facsimile function and a printer function. With this preferred structure, the multi-function peripheral device offers the same advantages as those of any one of the above described peripheral devices, and provides a still further advantage. Specifically, the structure makes it easy to detect a specific command in facsimile data so that the data will be directed to the facsimile function. Likewise, a specific command contained in print data is readily picked up so that the data in question will be sent to the printer function.

According to one further object of the invention, there is provided a multi-function peripheral device connected to an information processing device and having a plurality of functional units for exerting mutually different functions by exchanging data with the computer. The multi-function peripheral device includes a storage device for storing data from the computer, a specific command detector for judging whether the data coming from the computer and stored in the storage device includes a specific command corresponding to any one of the plurality of functional units and a data supplier for acting when the specific command detector judges that the specific command exists. The data supplier thereupon supplies the data from the computer including the specific command to the one of the functional units to which the specific command corresponds.

With such structure, a specific command included in the data from the computer is used as the basis for judging which functional unit the data is destined for, and the data in question is supplied automatically to the functional unit thus identified. This structure also eliminates the additional manufacturing cost of furnishing the traditional function switching means and the need for manually operating such means. Because the data from the computer goes into the storage device before undergoing a check for the presence of a specific command, the command located anywhere in the data may be detected and the data may be sent accordingly to the appropriate functional unit. The storage device may be a RAM, a hard disk, or any other appropriate tool of data accommodation.

BRIEF DESCRIPTION OF THE DRAWINGS

These and other objects and advantages of the invention will become apparent from the following detailed description of a preferred embodiment when taken in conjunction with the accompanying drawings, in which.

DETAILED DESCRIPTION OF PREFERRED EMBODIMENTS

Figure 1:
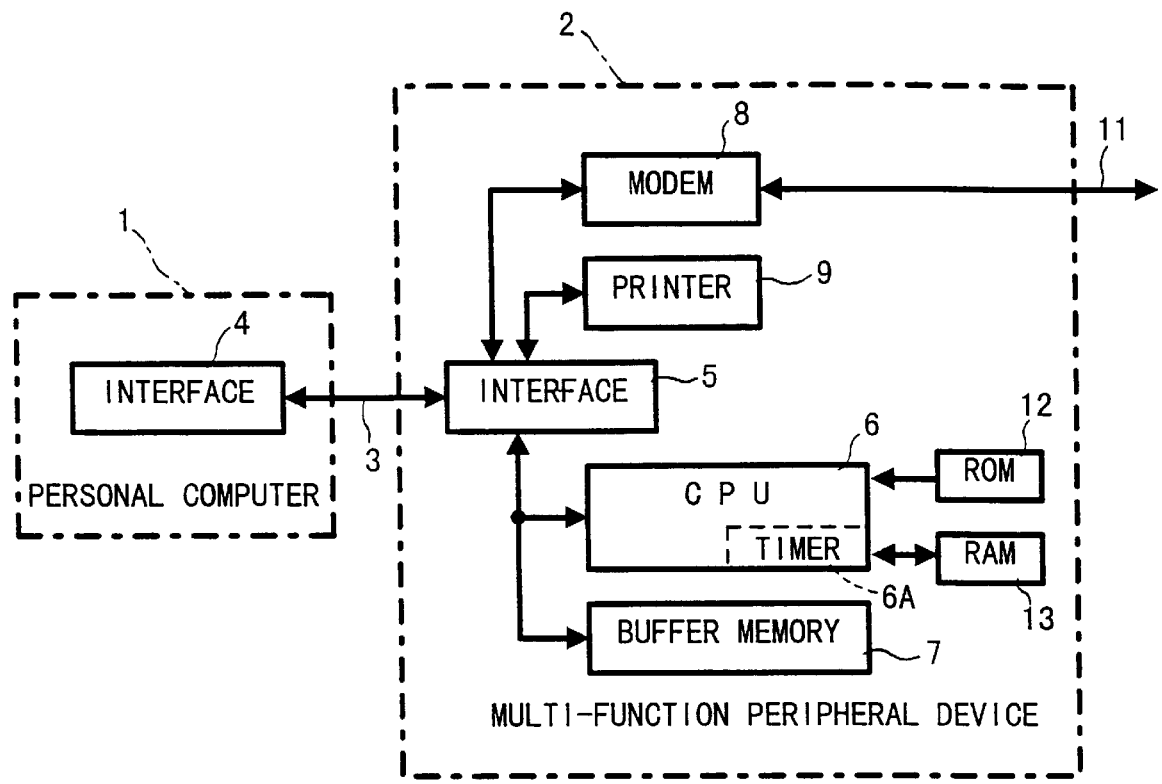
FIG. 1 is a schematic circuit block diagram of a multi-function peripheral device embodying the invention and connected to a personal computer.

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

For a general understanding of the features of the invention, reference is made to the drawings. In the drawings, like reference numerals have been used throughout to designate identical elements.

A preferred embodiment of the invention will now be described with reference to the accompanying drawings.

FIG. 1 is a schematic circuit block diagram of a multi-function peripheral device 2 embodying the invention and connected to a personal computer 1 via a cable 3. The personal computer 1 comprises an interface 4 to control data exchanges with the multi-functional peripheral device 2. The multi-functional peripheral device 2 includes an interface 5 that controls data exchanges with the personal computer 1, a CPU 6 for overall control of the device 2, a buffer memory 7 that temporarily accommodates data from the personal computer 1 to detect a specific command within the data, a modem 8 offering a facsimile communication function, and a printer 9 that provides a print function. The interfaces 4 and 5 are interconnected by the cable 3. The modem 8 is connected to, for example, a telephone line 11 adopted as a typical communication line. The CPU 6 is connected to a ROM 12 that stores various processing programs to be executed by the CPU 6, and a RAM 13 acts as a working memory used when the CPU 6 carries out its processing.

The modem 8 and printer 9 are mutually different functional units each exchanging data with the personal computer 1. The CPU 6 judges whether a specific command corresponding to the modem 8 exists within a range of 20 bytes from the beginning of the data coming from the personal computer 1. When the CPU 6 judges that the specific command exists in the data, it supplies the modem 8 corresponding to the specific command with the data from the personal computer 1 including that command.

Figure 2:
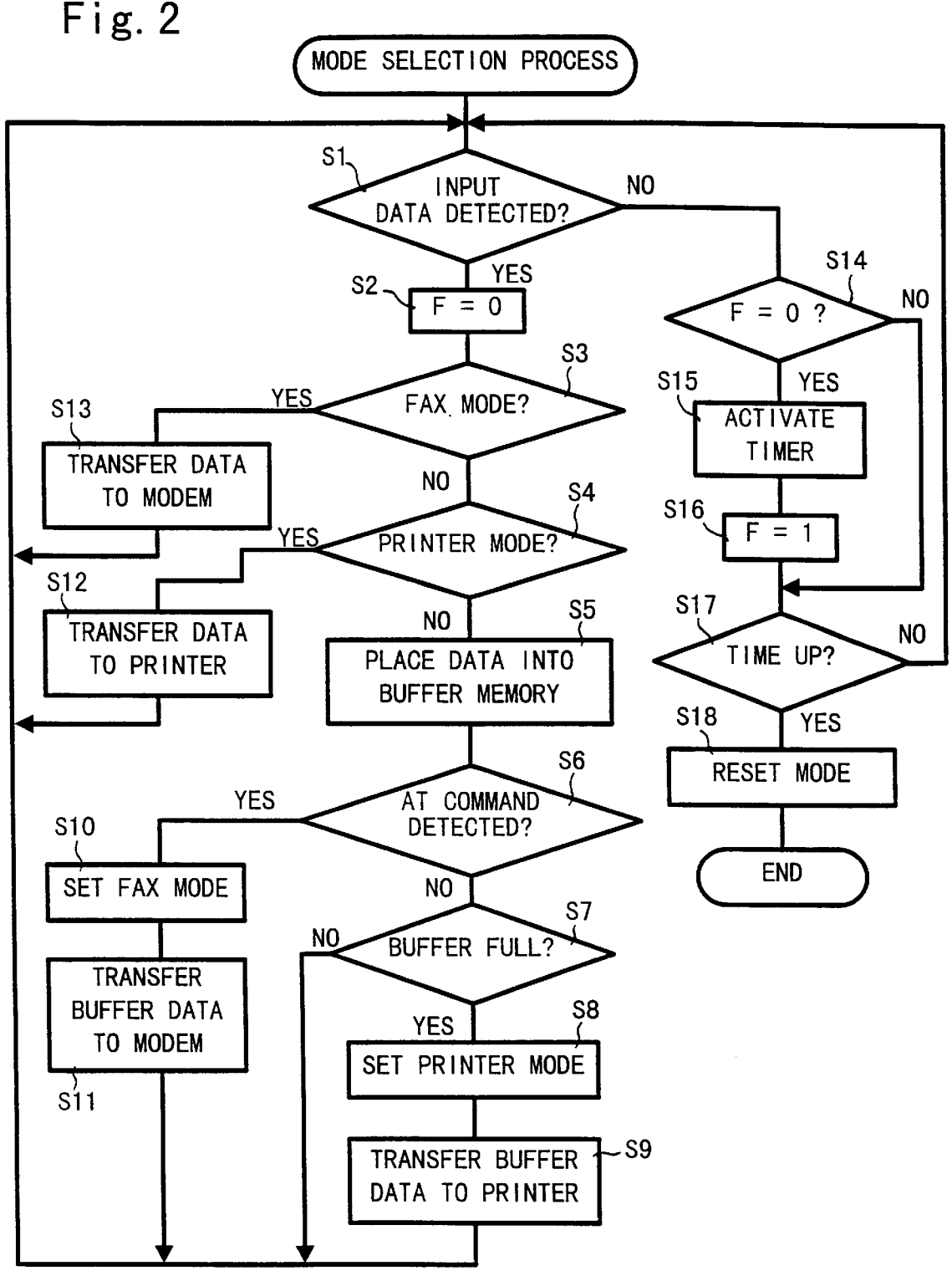
FIG. 2 is a flowchart of steps constituting a mode selection process performed by the multi-function peripheral device of FIG. 1.

The function of the multi-function peripheral device 2 in executing a mode selection process routine will now be described with reference to the flowchart of FIG. 2.

In step S1, the CPU 6 checks to see if data is input from the interface 4 of the personal computer 1 to the interface 5 via the cable 3. If input data is detected ("YES" in step S1), step S2 is reached in which the CPU 6 resets a flag F to 0. The flag F indicates the presence or absence of input data. When the flag F indicates the absence of input data, it is set to 1; when the flag F indicates the presence of input data, it is reset to 0. In step S3, the CPU 6 checks to see if a fax mode is set. That is, a check is made to see if the modem 8 has been activated and if data is being transferred from the personal computer 1 to the modem 8. If the fax mode is not recognized ("NO" in step S3), step S4 is reached in which the CPU 6 checks to see if a printer mode is set. More specifically, a check is made to see if the printer 9 has been activated and if data is being transferred from the personal computer 1 to the printer 9. If the printer mode is not recognized ("NO" in step S4), step S5 is reached in which the data input to the interface 5 is transferred successively to the buffer memory 7.

In step S6, the CPU 6 checks to see if the data input to the interface 5 includes an AT command specific to facsimile communication. The AT command is a command that begins with characters AT for controlling the modem 8. If the AT command is not detected ("NO" in step S6), step S7 is reached in which the CPU 6 checks to see if the buffer memory 7 has become full. If the buffer memory 7 is found to be full of data ("YES" in step S7), step S8 is reached in which the CPU 6 sets a printer mode. The buffer memory 7 has a capacity of 20 bytes, and if the AT command does not exist within 20 bytes from the beginning of the data coming from the personal computer 1, then the CPU 6 judges the data not to be destined for the modem 8, but to be destined for the other functional unit namely the printer 9 and activates the printer 9 accordingly. The printer mode is the preferable predetermined mode to be selected when the AT command is not detected in step S6 so that the input data is printed and can be checked for which functional unit the input data should be destined. However, alternatively, other modes corresponding to other functional units can also be selected as the predetermined mode if the multi-function peripheral device has any other functional unit. In step S9, the CPU 6 transfers the data from the buffer memory 7 to the printer 9 via the interface 5, and then step S1 is reached again.

In step S7, the buffer memory 7 may not be found full of data ("NO" in step S7). In that case, the CPU 6 returns to step S1 to check further for the presence of an AT command.

In step S6, the AT command specific to facsimile communication may be detected in the data input to the interface 5 ("YES" in step S6). In that case, the CPU 6 reaches step S10 and sets the fax mode. That is, the AT command is found to exist within 20 bytes from the beginning of the data coming from the personal computer and input to the interface 5, whereupon the CPU 6 judges the data to be destined for the modem 8 and activates the modem 8 accordingly. Step S10 is followed by step S11 in which the CPU 6 transfers the data from the buffer memory 7 to the modem 8 via the interface 5. After the data transfer, step S1 is reached again.

In step S4, the printer mode may be found to be set ("YES" in step S4). In that case, the CPU 6 reaches step S12 and transfers the data from the personal computer 1 to the printer 9 via the interface 5. Step S12 is followed by step S1. In other words, once the printer mode is established in step S8, the data input to the interface 5 is supplied directly to the printer 9 without the intervention of the buffer memory 7 for temporary data accommodation.

In step S3, the fax mode may be found to be set ("YES" in step S3). In that case, the CPU 6 reaches step S13 and transfers the data from the personal computer 1 to the modem 8 via the interface 5. Step S13 is followed by step S1. That is, once the fax mode is established in step S10, the data input to the interface 5 is supplied directly to the modem 8 without the intervention of the buffer memory 7 for temporary data storage.

In step S1, no data may be found to be input from the interface 4 of the personal computer 1 to the interface 5 via the cable 3 ("NO" in step S1). In that case, the CPU 6 goes to step S14 and checks to see if the flag F is reset to 0. If the flag F is found to be 0 ("YES" in step S14), that means the data was being input up to a point in time preceding the check. In that case, step S15 is reached in which the CPU 6 activates a timer 10A to measure the period of time in which no data is input. This timer 10A is in the form of, for example, a software timer and included in the CPU 6 utilizing a register arrangement as a down counter. A program sets an appropriate value on the down counter so that the set value will be counted down in synchronism with a clock signal of a predetermined cycle.

In step S16, the CPU 6 sets the flag F to 1 so as not to restart the timer. In step S17, the CPU 6 checks to see if time is up on the timer activated in step S15. If time is found to be up on the timer ("YES" in step S17), that means the time set on the timer has elapsed and that no data is input during that time to the interface 5 from the personal computer 1. In that case, the CPU 6 judges that the supply of data to the modem 8 or printer 9 has ended. The CPU 6 then reaches step S18 to terminate this routine by resetting the fax mode or printer mode.

The appropriate time set on the timer 6A is determined based on the operating specifications of the personal computer 1 and the multi-function peripheral device 2. For example, 120 seconds may be set as this time. Needless to say, the mode selection process routine is repeated every time a series of data bound for the modem 8 or printer 9 is input from the interface 4 of the personal computer 1 to the interface 5. The time set on the timer may be an appropriate period of time (e.g., 120 seconds) selected in accordance with the operation time of the application program run on the personal computer 1.

In step S17, time may yet to be up on the timer ("NO" in step S17). That means the state of no data input has yet to reach the end of the predetermined period of time. In such a case, step S1 is reached in which the CPU 6 waits for data to be input to the interface 5. Alternatively, the CPU 6 waits for a time-up state of the timer.

In step S14, the flag F may not be 0 ("NO" in step S14). The flag F, when set to 1, indicates that the timer has already started. In that case, step S17 is reached in which the CPU 6 waits for a time-up state of the timer. Alternatively, the CPU 6 waits for data to be input to the interface 5.

As described above, if the AT command specific to facsimile communication is found to exist within 20 bytes from the beginning of the data coming from the personal computer 1 and input to the interface 5, the data is transferred from the interface 5 to the modem 8. In turn, the modem 8 modulates a carrier based on the data input via the interface 5, and outputs the modulated carrier onto the telephone line 11.

On the other hand, if the AT command specific to facsimile communication is not detected within 20 bytes from the beginning of the data coming from the personal computer 1 and input to the interface 5, then the data is transferred from the interface 5 to the printer 9. In response, the printer prints onto recording paper images and/or characters on the basis of the data input via the interface 5.

If the state of no data input to the interface 5 has lasted for the predetermined period of time, the previously received data is considered to have ended, and the current mode is reset. That is, a neutral state different from both the fax mode and the printer mode is established.

Whereas the above embodiment has been shown adopting the telephone line 11 as the communication line, the communication line may be implemented in both wired and wireless fashion. The communication line may be either a public line of telecommunication or a dedicated line.

Although the preferred embodiment above has been shown judging whether a specific command exists within a predetermined length of data from the beginning thereof, the invention is not so limited. Alternatively, the whole data inputted from the personal computer 1 may be placed temporarily into the RAM 13 prior to the judgment so that CPU 6 can execute the judgment all through the whole data if it is necessary to judge whether any AT command is included in the inputted data. In this case, the specific command is allowed to exist anywhere within the data.

Figure 3:
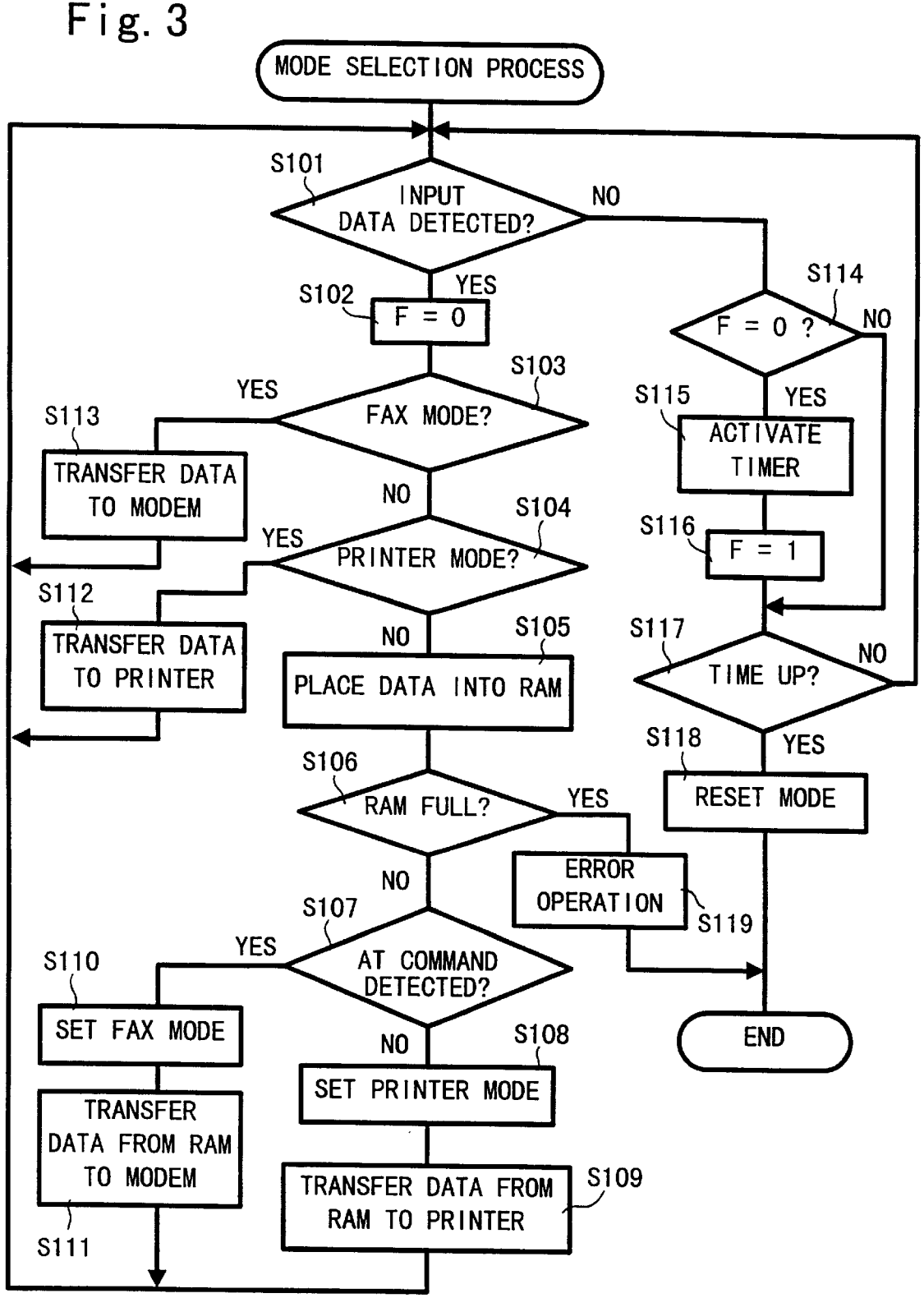
FIG. 3 is a flowchart of steps constituting an alternative mode selection process.

FIG. 3 is a flowchart of steps constituting this alternative mode selection process. In FIG. 3 like reference numerals have been used to represent like elements. The explanation has been abridged in so far as it is the same as that of the mode selection process shown in FIG. 2. In step S105, the CPU S6 stores the inputted data into a storage memory area which is allocated to store the inputted data in RAM 13 instead of processing at the step S5. In step S106, CPU 6 checks to see if the RAM 13 is full. If the RAM 13 is full, the program proceeds to an error operation (step S119) and the program ends. However, if the RAM 13 is not full, the CPU 6 checks to see if the data placed into RAM 13 includes an AT command specific to facsimile communication (step S107). If the AT command is not detected ("No" in step S107), step S108 is reached in which the CPU 6 sets a printer mode and the data is transferred from the RAM 13 to the printer in step S109. If the AT command is detected ("Yes" in step S107), the CPU 6 reaches step S110 and sets the fax mode. Then the data is transferred from RAM 13 to the modem 8 at step S111.

While the invention has been described in conjunction with specific embodiments thereof, it is evident that many alternatives, modifications and variations may be apparent to those skilled in the art. Accordingly, the preferred embodiments of the invention as set forth herein is intended to be illustrative, not limiting. Various changes may be made without departing from the spirit and scope of the invention as defined in the following claims.

What is claimed is:

1. A multi-function peripheral device for use with an information processing device, and having a plurality of functional units for exerting mutually different functions by exchanging data with said information processing device, said multi-function peripheral device comprising:

a specific command detector that detects whether data from said information processing device includes a specific command corresponding to any one of said plurality of functional units; and a data supplier that automatically supplies, when said specific command detector detects that the specific command exists, the data from said information processing device in which the specific command was detected to the one of the plurality of functional units to which the specific command corresponds.

2. The multi-function peripheral device according to claim 1, wherein said specific command detector detects whether the specific command corresponding to any one of said plurality of the functional units exists within a predetermined length of the data from said information processing device, the predetermined data length being defined relative to the beginning of the data.

3. The multi-function peripheral device according to claim 2, further comprising a buffer memory having a capacity to store only the predetermined length of the data and successively storing the data inputted from said information processing device, wherein said specific command detector detects whether the specific command corresponding to any one of said plurality of functional units exists in the data stored in said buffer memory and does not perform detecting on data inputted from the information processing device after the buffer memory has become full and wherein, when the buffer memory has become full, said data supplier supplies the data stored in the buffer memory to a predetermined one of said plurality of functional units.

4. The multi-function peripheral device according to claim 3, wherein, when said specific command detector detects that the specific command does not exist, said data supplier supplies the data from said information processing device to one of said plurality of the functional units to which the specific command does not correspond.

5. The multi-function peripheral device according to claim 2, wherein, having detected that no data has been received from said information processing device at least for a predetermined period of time, said specific command detector detects whether the specific command exists within a predetermined length of data received anew from said information processing device following the detection of the absence of data from said information processing device, the predetermined data length being defined relative to a beginning of the newly received data.

6. The multi-function peripheral device according to claim 1, wherein, when said specific command detector detects that the specific command does not exist, said data supplier supplies the data from said information processing device to one of said plurality of the functional units to which the specific command does not correspond.

7. The multi-function peripheral device according to claim 1, wherein said plurality of the functional units comprises a facsimile function unit and a printer function unit.

8. The multi-function peripheral device according to claim 1, further comprising a storage memory that stores whole data inputted from said information processing device, wherein said specific command detector detects whether the specific command corresponding to any one of said plurality of the functional units exists in the data stored in said storage memory.

9. A method for a multi-function peripheral device for use with an information processing device, and having a plurality of functional units for exerting mutually different functions by exchanging data with said information processing device, the method comprising the steps of:

detecting whether data from the information processing device includes a specific command corresponding to any one of the plurality of functional units; and automatically supplying, when it is detected that the specific command exists, the data from the information processing device in which the specific command was detected to the one of the functional units to which the specific command corresponds.

10. The method according to claim 9, wherein the step of detecting whether data from the information processing device includes a specific command comprises detecting whether the specific command corresponding to any one of the plurality of functional units exists within a predetermined length of the data from the information processing device, the predetermined data length being defined relative to a beginning of the data.

11. The method according to claim 10, wherein said step of detecting whether the specific command corresponding to any one of the plurality of functional units exists within a predetermined length further comprises successively storing the data inputted from the information processing device in a buffer memory having a capacity to store only the predetermined length of the data and not performing detecting on data inputted after the buffer memory has become full, and the method further comprises the step of supplying, when the buffer memory has become full, the data stored in the buffer memory to a predetermined one of the plurality of functional units.

12. The method according to claim 11, further comprising the step of supplying, when it is detected that the specific command does not exist, the data from the information processing device to one of the plurality of functional units to which the specific command does not correspond.

13. The method according to claim 10, further comprising, having detected that no data has been received from the information processing device at least for a predetermined period of time, the step of detecting whether the specific command exists within a predetermined length of data received anew from the information processing device following the detection of the absence of data from the information processing device, the predetermined data length being defined relative to a beginning of the newly received data.

14. The method according to claim 9, further comprising the step of supplying, when it is detected that the specific command does not exist, the data from the information processing device to one of the plurality of functional units to which the specific command does not correspond.

15. The method according to claim 9, further comprising the step of storing in a storage memory whole data inputted from the information processing device and detecting whether the specific command corresponding to any one of the plurality of functional units exists in the data stored in the storage memory.

16. A multi-function peripheral device for use with an information processing device, and having a plurality of functional units for exerting mutually different functions by exchanging data with the information processing device, the multi-function peripheral device comprising:

means for detecting whether data from the information processing device includes a specific command corresponding to any one of the plurality of functional units; and means for automatically supplying, when it is detected that the specific command exists, the data from the information processing device including the specific command to the one of the functional units to which the specific command corresponds.

17. The multi-function peripheral device according to claim 16, wherein the means for detecting whether the specific command corresponding to any one of the plurality of functional units exists within a predetermined length of the data from the information processing device, the predetermined data length being defined relative to a beginning of the data.

18. The multi-function peripheral device according to claim 17, further comprising buffer memory means for successively storing the data inputted from the information processing device and having a capacity to store only the predetermined length of the data, wherein the means for detecting does not perform detecting on data inputted after the buffer memory means has become full and wherein the means for supplying, when the buffer memory means has become full, supplies said data stored in the buffer memory means to a predetermined one of the plurality of the functional units.

19. The multi-function peripheral device according to claim 18, wherein the means for supplying, when it is detected that the specific command does not exist, supplies the data from the information processing device to one of the plurality of the functional units to which the specific command does not correspond.

20. The multi-function peripheral device according to claim 16, further comprising storage memory means for storing whole data inputted from the information processing device, wherein the means for detecting detects whether the specific command corresponding to any one of the plurality of the functional units exists in the data stored in the storage memory means.

* * * * *